J. A. TURNER.
BELT COUPLING.
APPLICATION FILED APR. 13, 1921.

1,391,285.

Patented Sept. 20, 1921.

Inventor
Julius A. Turner
Seymour Earl
Atty

UNITED STATES PATENT OFFICE.

JULIUS A. TURNER, OF NEW MARLBORO, MASSACHUSETTS.

BELT-COUPLING.

1,391,285.  Specification of Letters Patent.  Patented Sept. 20, 1921.

Application filed April 13, 1921. Serial No. 460,966.

*To all whom it may concern:*

Be it known that I, JULIUS A. TURNER, a citizen of the United States, residing at New Marlboro, in the county of Berkshire and State of Massachusetts, have invented a new and useful Improvement in Belt-Couplings; and I do hereby declare the following, when taken in connection with the accompanying drawings and the characters of reference marked thereon, to be a full, clear, and exact description of the same, and which said drawings constitute part of this application, and represent, in—

Figure 1:
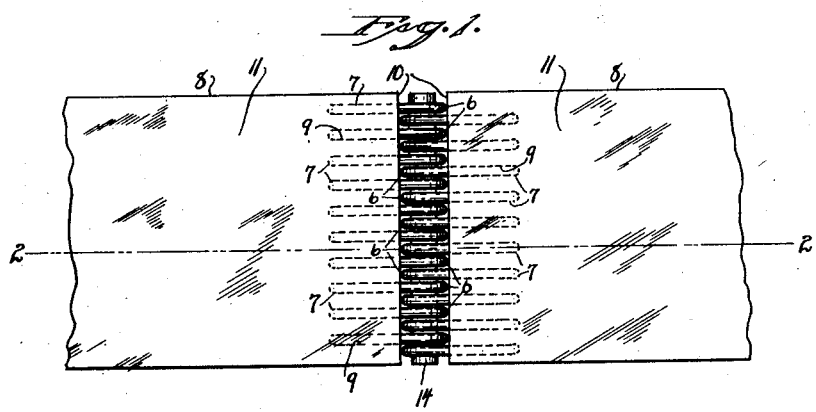

Figure 1, a broken inside face view of a belt provided with one form which my improved belt-coupling may assume.

Figure 2:
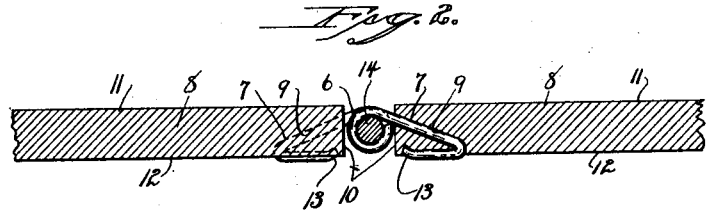

Fig. 2, a view thereof in longitudinal section on the line 2—2 of Fig. 1.

Figure 3:

Fig. 3, a detached view in side elevation of one of the fastening-pieces.

Figure 4:

Fig. 4, a corresponding view of a modified form thereof.

Figure 5:
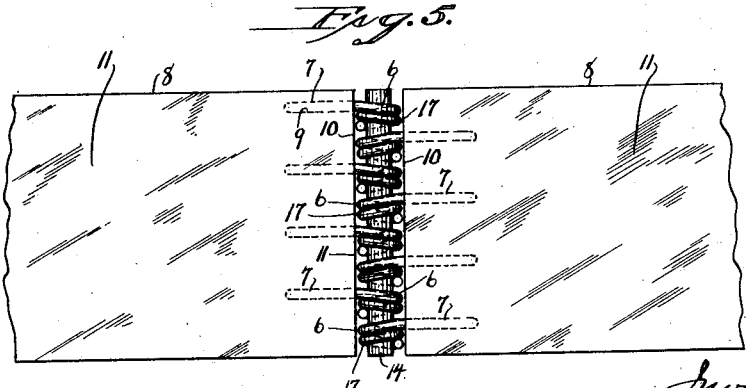

Fig. 5, a view corresponding to Fig. 1, but illustrating still another form of fastening-piece.

My invention relates to an improved belt-coupling, the object being to provide a simple, durable, strong and convenient coupling primarily designed to be used as a power-belt coupling but also available for use in other situations, such as for fastening belt-like structures for automobile tires. My improvement is constructed with particular reference, however, to eliminating the highly objectionable factors of slipping and noise characteristic of the couplings now in general use in power-belts and due to the metal they present upon their driving-faces to contact with the pulleys over which they run.

With these ends in view my invention consists in a belt-coupling having fastening-pieces provided with eyes and with clenching-fingers, the latter being adapted to be passed diagonally through the square edges of the belt-ends and clenched upon the outer face thereof.

My invention further consists in certain details of construction and combination of parts as will be hereinafter described and pointed out in the claims.

In carrying out my invention herein shown as applied to power-belts, I employ a plurality of fastening-pieces, each made of a single piece of wire and each consisting of an eye 6 having a tangentially-arranged clenching-tail 7, the inner end of which merges into the periphery of the eye. The eyes of such fastening-pieces are preferably a trifle smalled in diameter than the thickness of the belt in which the fastening-pieces are to be installed, as, for instance, the belt 8. Similarly, the length of the clenching-tails 7 will depend upon the thickness of the belt. On account of the tangential arrangement of the clenching-tails 7 with respect to the eyes 6, I am enabled to pass the clenching-tails diagonally through holes 9 pierced in the square faces 10 of the belt-ends, the said holes entering the faces near the driving- or pulley-face 11 of the belt and inclining outward, so as to emerge from the outer face 12 of the belt at a point some distance back from the square faces 10 of the belt-ends, as shown in Fig. 2. The projecting ends of the clenching-tails are then turned inward at an acute angle toward the eyes 6 of the fastening-pieces and more or less embedded in the outer face of the belt, their extreme ends being, by preference, set inward, as at 13, so that, when the fastening-pieces are finally installed in the belt-ends, their clenching-tails have the form of acute-angled hooks, lying within the thickness of the belt-ends, so as not to be exposed upon the driving-face thereof. As shown, the eyes 6 are a trifle smaller in diameter than the thickness of the belt. This is not imperative, but it is desirable at least that the eyes shall be so positioned that their inner edges will fall within the plane of the driving-face of the belt, or at least not project thereinto.

Fastening-pieces of the character described are arranged in two parallel rows, in the respective belt-ends in such spaced relationship that when the ends of the belt are brought together, the eyes pass between each other and line up for the insertion of the coupling-pin 14, which may be rawhide or other material.

As thus constructed, my improved belt-coupling is not only very simple and durable but exposes no metal upon the driving-face of the belt to make contact with the pulleys, whereby the factors of slipping and noise are eliminated.

In the modified construction shown by Fig. 4, the fastening-piece is struck out of sheet-metal, but corresponds to the wire fastening-piece of Fig. 3, in so far as its clenching-tail 15 is tangential to its eye 16, with which it is integral. In the modified construction shown by Fig. 5, the fastening-pieces, which are made of wire, each consist of an eye 6, a clenching-tail 7 and an additional coil 17, corresponding to the eye 6, whereby the number of clenching-tails, in proportion to the eyes, is reduced.

In applying my improved couplings to belts or belt-like structures other than power-belts, the forms of the fastening-units and the mode of their application will be in substantial accordance with what I have herein shown and described.

I claim:

1. The combination with a belt, of two groups of fastening-pieces for the respective edges thereof, each fastening-piece consisting of an eye and a tangential clenching-tail, the tails of the respective fastening-pieces being positioned in the respective belt-ends so as to extend diagonally between the transverse edge thereof and one of the faces thereof.

2. The combination with a belt, of a plurality of fastening-pieces, each consisting of an eye and a tangential clenching-tail, which latter are inserted diagonally into the square edges of the belt-ends at a point near the driving-face thereof and turned inward toward the said edges of the belt-ends and clenched upon the outer faces thereof, whereby the said tails in the finished belt have the form of acute-angled hooks.

3. The combination with a belt, of fastening-pieces arranged in spaced alternation in the belt-ends, each of the said fastening-pieces having an eye and a tangentially-arranged clenching-tail, and the tails of the said fastening-pieces being passed diagonally through the square edges of the belt-ends and clenched upon the outer faces of the same, the eyes of all of the fastening-pieces being located in line between the belt-ends and receiving a coupling-pin.

In testimony whereof I have signed this specification in the presence of two subscribing witnesses.

JULIUS A. TURNER.

Witnesses:
CHARLES E. HULL,
EDWARD C. WILCOX, Jr.